(12) United States Patent
Nomura et al.

(10) Patent No.: US 6,680,784 B1
(45) Date of Patent: Jan. 20, 2004

(54) HIGH SPEED PRINTER WITH THE ABILITY TO PRINT AT DIFFERENT PRINT DENSITIES

(75) Inventors: Reiko Nomura, Nagano (JP); Takashi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/324,722

(22) Filed: Jun. 3, 1999

(30) Foreign Application Priority Data

Jun. 3, 1998 (JP) .......................................... 10-154848

(51) Int. Cl.[7] .............................................. G06F 15/00
(52) U.S. Cl. ...................... 358/1.15; 358/1.13; 358/1.9; 358/1.2
(58) Field of Search ................................ 358/1.5, 1.13, 358/1.9, 1.2; 347/129–132, 250, 43, 40, 41, 131, 188; 399/138; 345/143, 144, 142, 141; 400/45, 46, 120.09, 120.11, 62, 63, 76

(56) References Cited

U.S. PATENT DOCUMENTS

| 5,093,903 A | 3/1992 | Sodoh et al. ................. 358/1.2 |
| 5,499,321 A | 3/1996 | Hayashi et al. ............... 358/1.5 |
| 5,535,308 A | 7/1996 | Hayashi et al. ............... 358/1.8 |
| 5,680,488 A | 10/1997 | Shimooku .................... 382/298 |

FOREIGN PATENT DOCUMENTS

| EP | 0 481 787 A2 | 4/1992 | ............ B41J/2/455 |
| EP | 0 582 434 A1 | 2/1994 | .......... G06K/15/10 |
| EP | 0 625 761 A2 | 11/1994 | ........... G06F/15/62 |

*Primary Examiner*—Edward Coles
*Assistant Examiner*—Twyler Lamb
(74) *Attorney, Agent, or Firm*—Sughrue Mion, PLLC

(57) ABSTRACT

When 31-dot space data specified in 120 dpi from a host is expanded in an image buffer 41 in 90 dpi, a command interpretation section of a printer finds 23/90 dots and an error 43 corresponding to 31/120 by calculation. Error correction information 44 indicating occurrence of the error 43 and the error amount is placed at a position in the image buffer 41 where print data cannot exist. An engine control section of the printer controls head drive in the amount to which the shift distance as long as error correction is added based on the error correction information 44.

12 Claims, 7 Drawing Sheets

44: ERROR CORRECTION INFORMATION BIT

HIGH SPEED PRINTER WITH THE ABILITY TO PRINT AT DIFFERENT PRINT DENSITIES

BACKGROUND OF THE INVENTION

1. Field of the Invention

This invention relates to a print control technology in application where high print speed is required in a printer, particularly in a serial printer.

2. Description of the Related Art

Some printers can be used at a print quality level selected from among several print quality levels in response to the required print speed. For example, when the printer is set to a standard image quality mode, it prints in 240 dpi; when the printer is set to a high speed mode, it prints in 120 dpi; and when the printer is set to a very high speed mode, it prints in 90 dpi.

Some conventional serial printers are provided each with an image buffer for improving print throughput. The image buffer needs to be related to the pins of an actual print head and thus must be configured in expansion density responsive to the pin cycle of the head. That is, in the standard image quality mode, an image is expanded in 240 dpi; in the high speed mode, an image is expanded in 120 dpi; and in the very high speed mode, an image is expanded in 90 dpi.

By the way, since the host which sends a print instruction to a printer sends data without considering the printer setting, data in different print densities may be mixed in one-line data in the expansion state in the image buffer. When the printer receives such data, the situation is avoided by either of the following methods:

In the first method, when it is determined that data different in print density has been sent, the image expanded so far is printed and the subsequent image is newly expanded.

In the second method, the least common multiple of the different densities mixed in one line is found and an image is expanded in the density. For example, if it is recognized that data in 90 dpi and data in 120 dpi are mixed, the image is expanded in 360 dpi.

Thus, if either the first or second method is adopted, the printing must slow down.

By the way, an area where text or an image does not exist, such as space or a move part of a position specification command, is expanded as a null image pattern (non-print data); if the above-described mixed portion exists in such an area, either the first or second method is used.

If a text pattern or a graphic image pattern exists in parts different in print density, it is impossible to expand it in different print densities on the image buffer. Therefore, the above-described avoidance method must be adopted. However, if information concerning print position setting is only specified in a density different from the current print density set in the printer, it is not necessarily possible to say definitely that the uniform print density corresponding to the pin cycle of the head is required. This point will be discussed below with examples:

FIG. 4 shows an example 40 of print data sent from a host. It indicates that characters A and B of an ANK character set represented in hexadecimal code are printed in spacing of a predetermined amount (represented by ESC/P of a standard printer control code system most frequently used in serial printers). The spacing between the characters A and B is specified in $36/120$ inches. Assuming that the printer is set to the above-mentioned very high speed mode (90 dpi) when it receives the instruction, $$36/120 = 27/90$$

thus, if 27-dot space can be provided on the image buffer, position control similar to that specified from the host can be performed.

FIG. 5 shows a print data example different from the example in FIG. 4 only in character spacing. The spacing between characters A and B is specified in $31/120$ inches. In this case, when an attempt is made to convert the denominator of $31/120$ into 90, $$31/120 = 93/360 = 23/90 \text{ and the remainder is } 1/360.$$

If the data is, for example, graphic data, it is impossible to print $1/360$, namely, $0.25/90$ dot. However, the spacing relates to the drive amount of a carriage motor for moving a head, thus control dependent on the pin cycle of the head need not necessarily be performed.

Based on the viewpoint, a way can be designed to print at high speed in low resolution even if a printer receives a print instruction containing position specification data of different resolution from that set as the print quality of the printer; such an idea is not involved in the conventional serial printers.

SUMMARY OF THE INVENTION

It is therefore an object of the invention to provide a printer capable of continuing to print at high speed even if one-line data sent from a host contains data different in print density.

A printer for solving the problem is a printer for enabling the user to select one of print densities, as described below:

In this invention, there is provided a printer comprising an image buffer for storing unprinted data in a bit image format and a print instruction conversion section for interpreting a received print instruction and executing bit image expansion in the image buffer in the density responsive to the print density selected in the printer. That is, when the printer is set to a print density of 90 dpi, basically bit image expansion is executed in 90 dpi. Upon reception of print-position specification information, which represents a shift distance in any density other than the print density selected by the printer, exceptionally the print instruction conversion section converts the shift distance into that of the selected print density and represents in the image buffer.

In addition to the above-described configuration, in this invention, also included is a line buffer for dividing a received print instruction for each piece of information concerning one-line print scanning which is retained thereby. If print information with the print density selected by the printer and print-position specification information with a shift distance in any other density than selected are mixed in the information concerning one-line print scanning retained in the line buffer, the print instruction conversion section converts the shift distance into the selected print density.

Further, in this invention, also included is error correction means for correcting an error occurring when the print instruction conversion section converts the shift distance into that of the print density. That is, if the print density conversion causes an error to occur between the shift distance, being represented by the print-position specification information, and a shift distance, being represented by bit image data expanded in the image buffer, error correction means is included.

The specific error correction means may be configured as follows: For example, error information is prepared by performing the following calculation: The shift distance of a conversion source represented with a dot pitch value as the denominator and the number of dots as the numerator is multiplied by the dot pitch value of the current print density selected in the printer. If the calculation result does not become an integer, it is recognized that an error occurs. In this case, in the fraction of the calculation result, the integer value part found by dividing the numerator by the denominator is output as the number of dots representing the shift distance of a conversion destination and the remainder found by dividing the numerator by the denominator is output as an error amount.

In this invention, output of the number of dots representing the integer value and output of the error amount corresponding to the remainder are received and blank bits corresponding to the number of dots of the integer value and error correction information responsive to the error amount are expanded in the image buffer. Engine control means reads the error correction information on bit image and drives a print engine, particularly a print head is controlled based on the error correction information.

In this case, if the error correction information is recognized as print data in error and is printed on actual paper, it is inconvenient. To avoid this, in the printer as claimed in claim 6, an area where print information does not exist is provided on the bit image data expanded in the image buffer, and the error correction information is stored in the area where print information does not exist.

BRIEF DESCRIPTION OF THE DRAWINGS

In the accompanying drawings:

FIG. 3A is a drawing to show data placement and correspondence in different print densities and FIG. 3B is an enlarged view of part 42 surrounded by the alternate long and short dash line in FIG. 3A;

DESCRIPTION OF THE PREFERRED EMBODIMENTS

Referring now to the accompanying drawings, there is shown one embodiment of the invention.

In the embodiment, printing is executed at predetermined print speed with mixed data different in print density in the main scanning direction of a printer, as seen from the description that follows. For convenience, the description centers on an example wherein a printer 1 is a dot matrix printer of a nine-pin head configuration, the print density is set to 90 dpi, and characters A and B are printed with a $31/120$-inch spacing therebetween as described in [Related Art].

Figure 1:
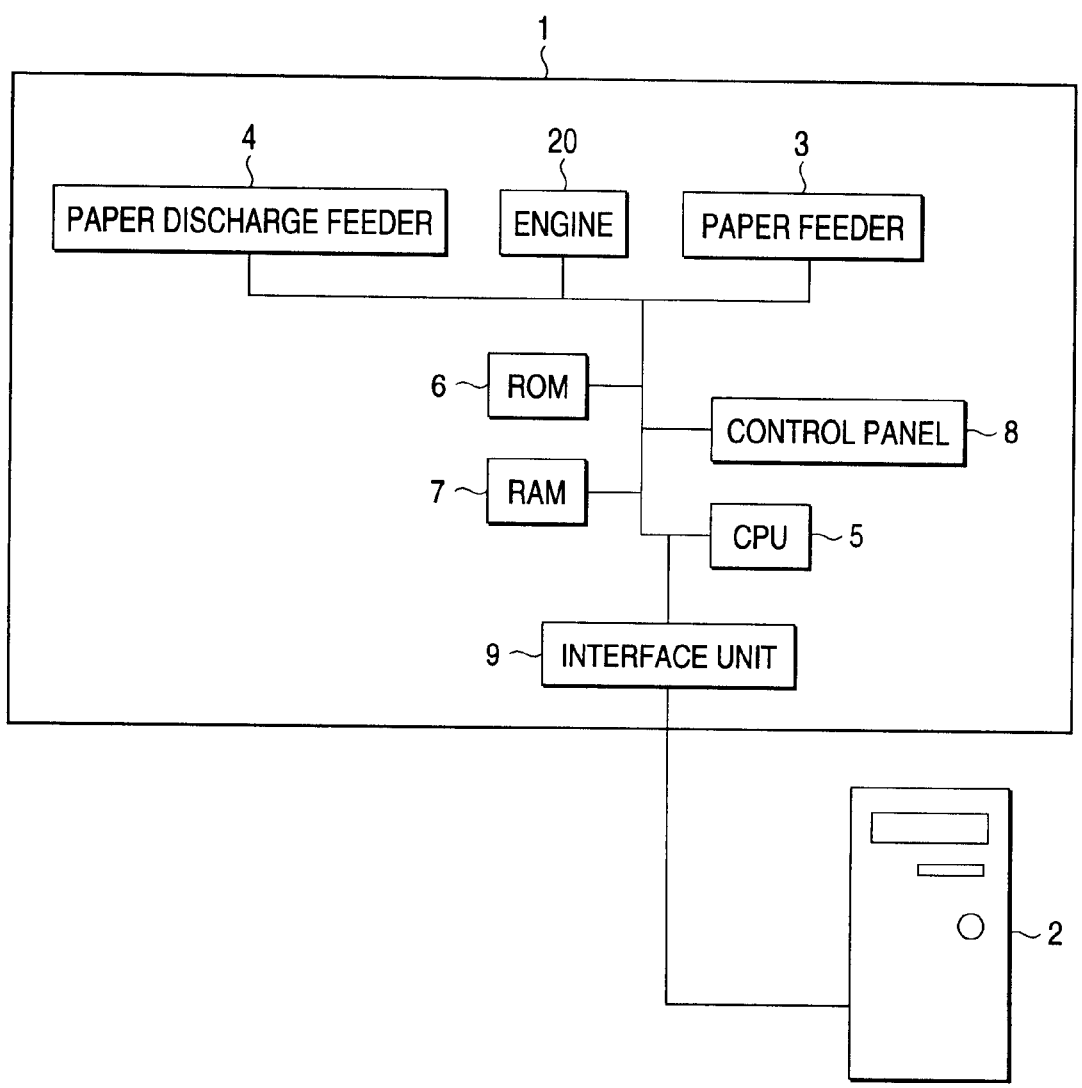
FIG. 1 is a diagram to show the hardware configuration of a printer in an embodiment of the invention.

FIG. 1 is a block diagram to show the hardware configuration of the printer 1 of the embodiment. In the embodiment, the printer 1 has a power mechanism section consisting of a paper feeder 3 for supplying paper to the inside of the printer, a print engine 20 for printing, and a paper discharge feeder 4 for discharging paper to the outside of the printer. The mechanism section of the printer is controlled by a printer control section made of a computer consisting of a CPU (central processing unit) 5, ROM (read-only memory) 6, and RAM (random access memory) 7. The printer control section is connected to a host 2 through an interface unit 9 and controls the parts of the mechanism section for performing actual print operation in accordance with a printer control language sent from the host 2. A control panel 8 enables the user to select quality responsive to print speed, as he or she desires, for setting a print density. When the printer 1 of the embodiment is set to a standard image quality mode, it prints in 240 dpi; when the printer 1 is set to a high speed mode, it prints in 120 dpi; and when the printer 1 is set to a very high speed mode, it prints in 90 dpi. The print density may be set and changed by a utility function of a printer driver from the host 2 and the print density setting may be stored in the printer 1.

Figure 2:
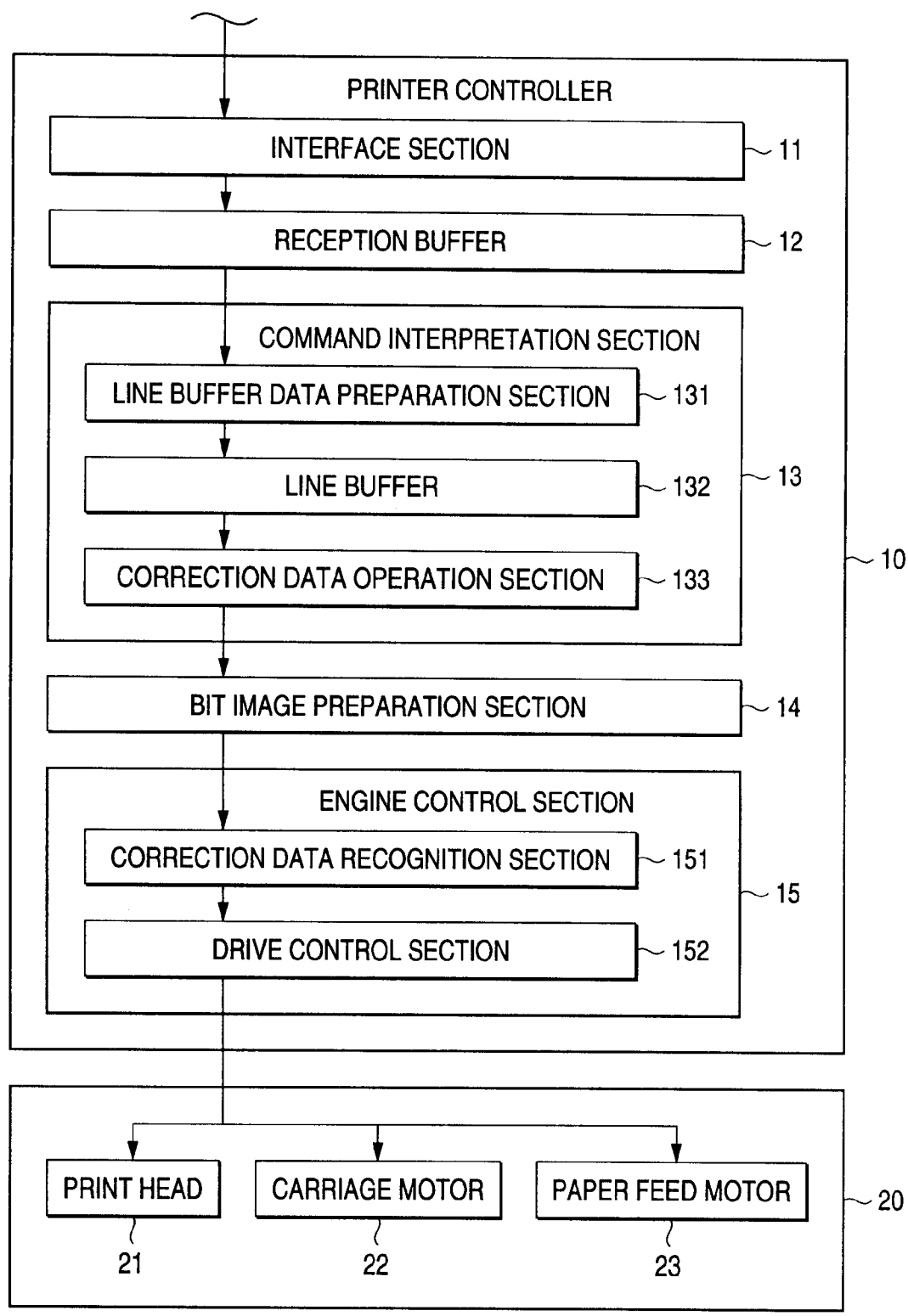
FIG. 2 is a functional block diagram of a printer control section.

FIG. 2 is a functional block diagram of the printer control section provided by the CPU 5 which executes an application program stored in the ROM 6. Printer controller 10 in the embodiment has features different from those in related art in that it has a function of converting a print instruction sent in the print density specified by the host 2 into the print density set in the printer by a command interpretation section 13 and a bit image data preparation section 14 and a function of driving and controlling a print head 21 in the print engine 20 by an engine control section 15 in accordance with the density as the conversion result and correction information.

A line buffer data preparation section 131 of the command interpretation section 13 divides data once stored in a reception buffer 12 for each piece of information concerning one-line print scanning and places the divided data in a line buffer 132 of a data retention function assigned to a predetermined address in the RAM 7. If print information represented in the current print density selected in the printer and print-position specification information with a shift distance represented in any density other than the selected density are mixed in the information concerning the one-line print scanning retained in the line buffer 132, a correction data operation section 133 converts the density into that set in the printer and prepares error correction information according to a procedure described later with reference to FIG. 7.

The bit image data preparation section 14 represents move information of the print head (and a carriage with the head) represented in the density resulting from the conversion as blank bits on a bit image and represents error correction information at a predetermined position on the bit image.

The engine control section 15 reads the error correction information from bit image data expanded in an image buffer in a correction data recognition section 151 and drives a carriage motor 22 so as to cause the head to move as much as the correction in a drive control section 152.

Figure 3:
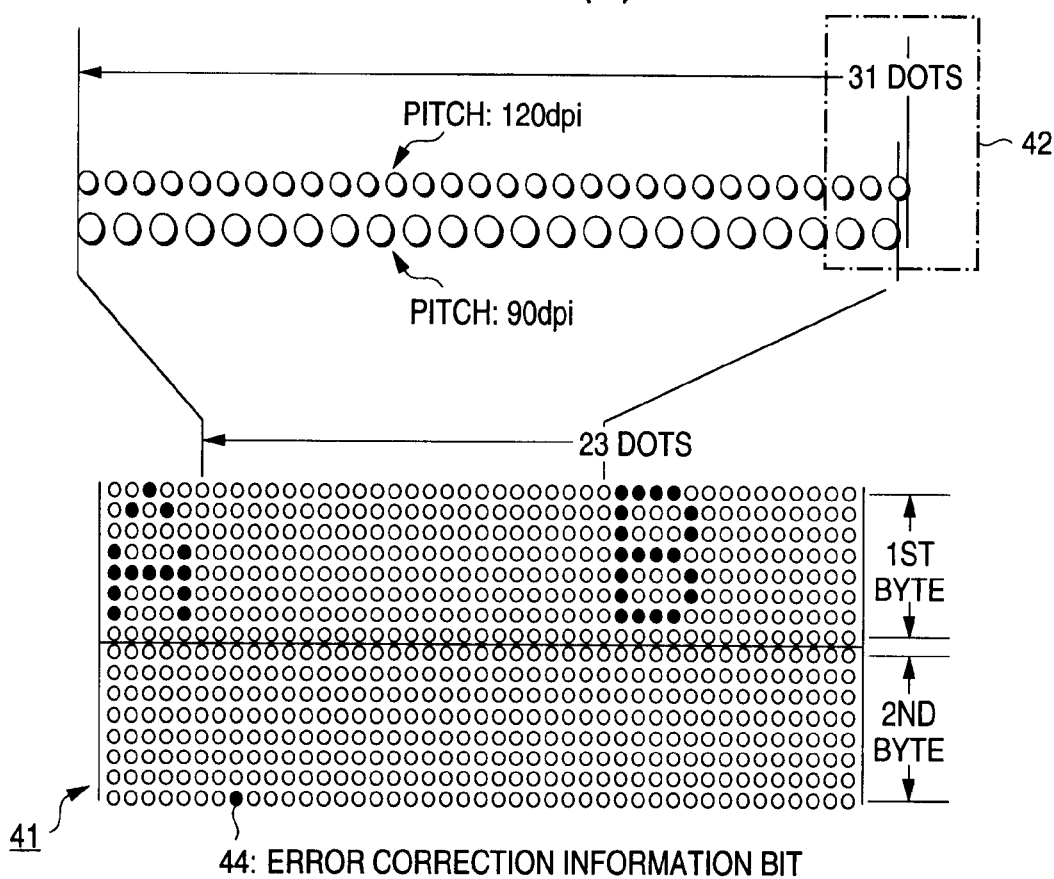
FIGS. 3A and 3B are drawings to show bit image data expanded on an image buffer.
Figure 3:
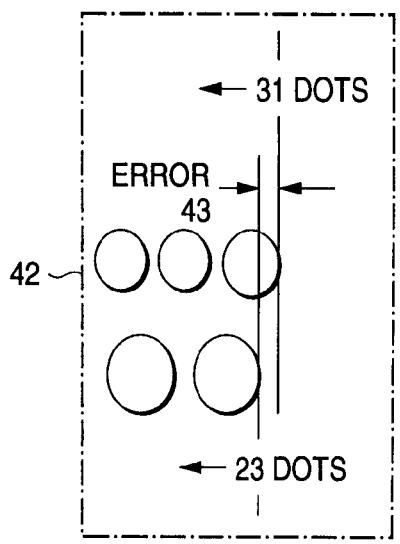
Figure 4:
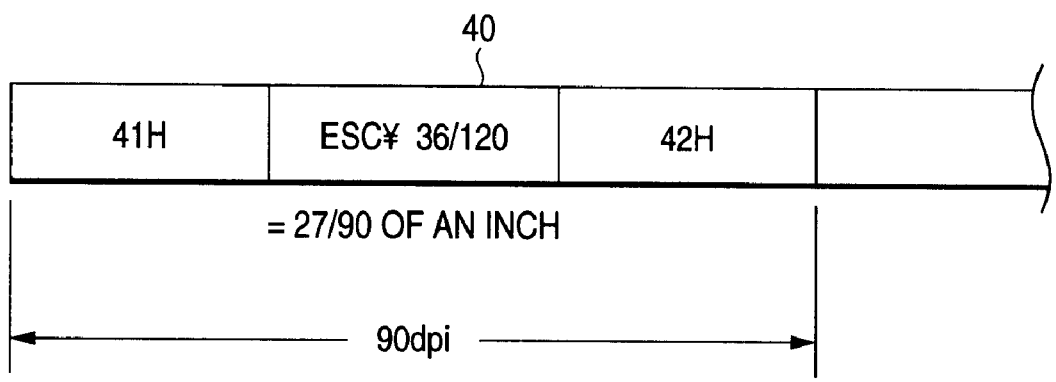
FIG. 4 is a drawing to show a print instruction for printing in a predetermined spacing between characters A and B.

FIG. 3 shows a print image expanded in bit image also containing the above-mentioned error correction information. FIG. 3A represents the correspondence at the print density conversion time at the upper stage. The print image expanded in bit image at the lower stage of FIG. 3A represents an image expanded in 90 dpi corresponding to a dot matrix printer having a nine-pin head. To handle the nine-pin head, a two-byte area is provided in the vertical direction. An ANK character is represented 7 (vertical)×5 (horizontal) dots, but there is a possibility that the first to ninth vertical dots may be used as an image in response to a character attribute of underline, double specification, etc. However, the remaining seven dot lines are reserved as an always unused area, namely, an area where print information cannot exist. FIG. 3B is an enlarged view of part 42 surrounded by the alternate long and short dash line in FIG. 3A.

Figure 5:
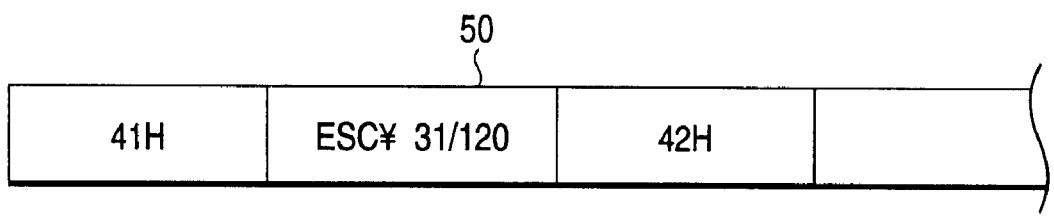
FIG. 5 is a drawing to show a print instruction for printing in a spacing different from that in FIG. 4.
Figure 6:
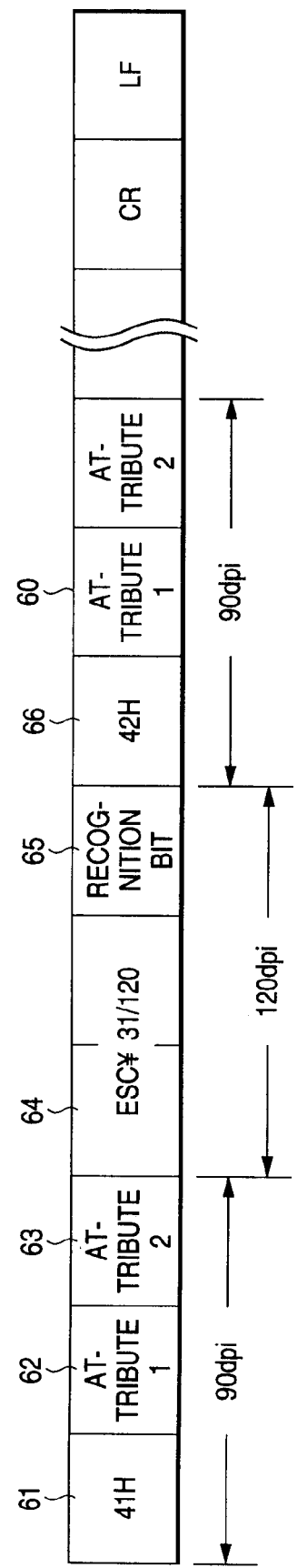
FIG. 6 is a drawing to show the print instruction contents placed in a line buffer.

FIG. 6 shows the contents of data retained in the line buffer 132 when the printer 1 of the embodiment receives a print instruction (instruction 50 shown in FIG. 5 plus character attribute information).

Figure 7:
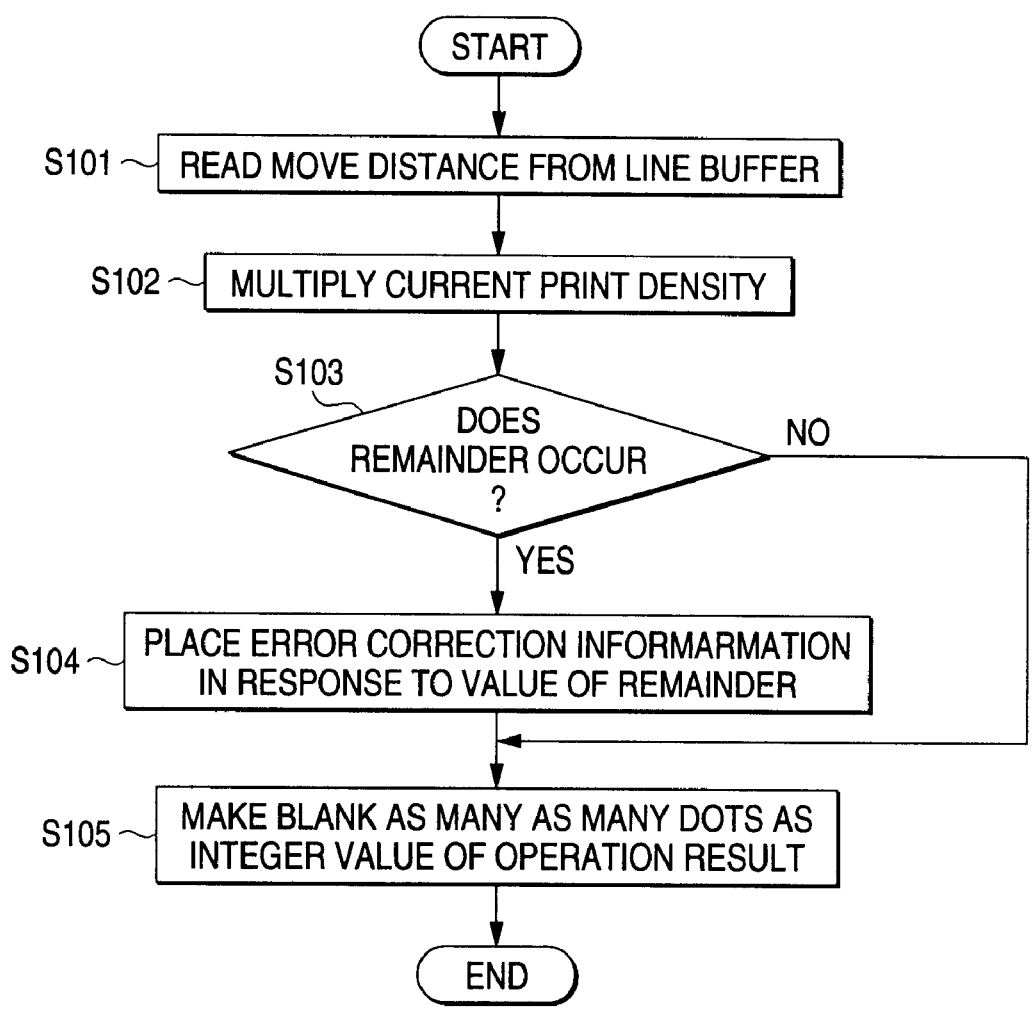
FIG. 7 is a flowchart to show a processing procedure in a correction data operation section.
Figure 8:
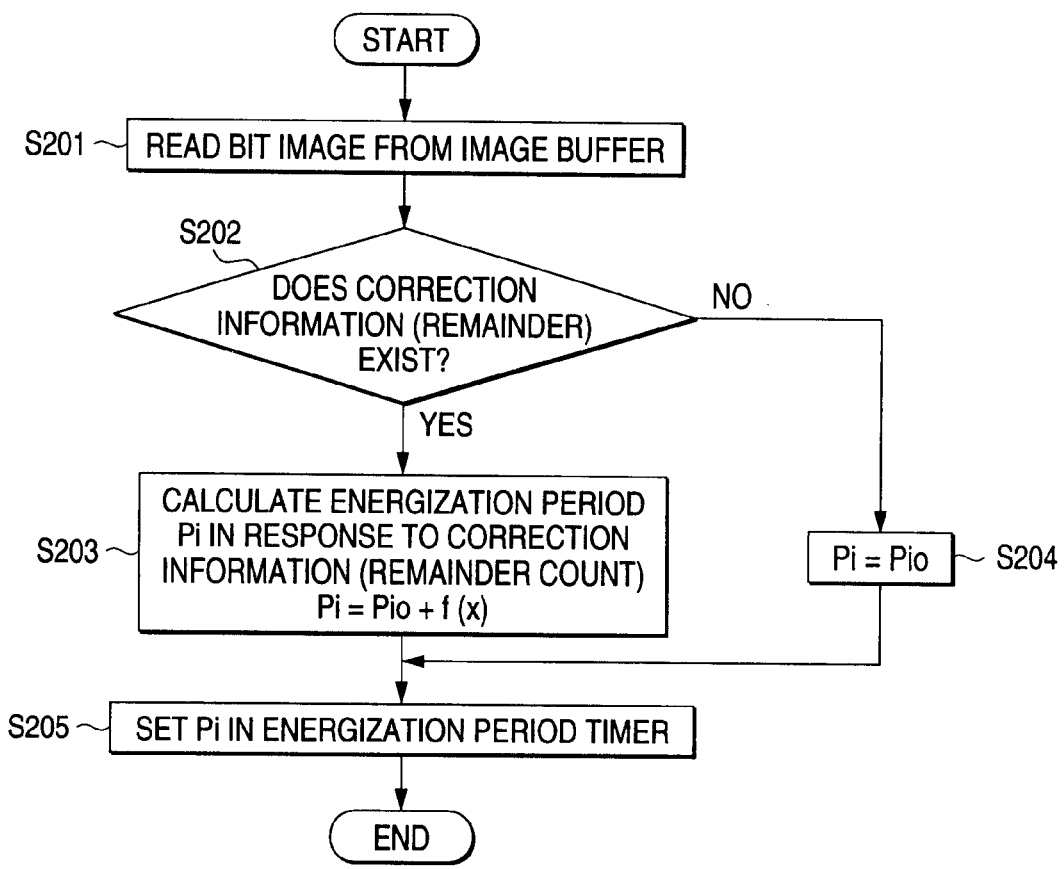
FIG. 8 is a flowchart to show a processing procedure in an engine control section.

A flow from reception of a print instruction to completion of actual printing will be discussed also with reference to flowcharts shown in FIGS. 7 and 8.

Data sent from the host 2 is stored in the reception buffer 12 through an interface section 11. The line buffer data preparation section 131 divides the stored print instruction for each piece of information concerning one-line print scanning and places the divided parts in the line buffer 132.

In FIG. 6, the first three data pieces 61 to 63 of the data placed in the line buffer represent character A and its character attributes, namely, enlargement specification, reduction specification,. double specification, longitudinal double size specification, etc. Therefore, in this section, there is no problem in expanding in the image buffer in 90 dpi set in the printer. Data 64 represents a space shift distance from the character A and data 65 represents a space recognition bit. At this time, data is sent from the host irrespective of the print density set in the printer (90 dpi), thus the shift distance is set based on the premise that the print density is 120 dpi. Data 66 represents character B, followed by subsequent data and a line feed.

The correction data operation section 133 performs operation on the data 64 to convert the shift distance represented in 120 dpi into that in 90 dpi and also finds an error caused by the conversion. FIG. 7 is a flowchart to show the procedure.

First, the shift distance 64 "$31/120$ inches" placed in the line buffer 132 is read at step S101. It is multiplied by the value of the current print density set in the printer 1, 90, at step S102.

$$(31/120) \times 90 = 93/4 = 23 \text{ and the remainder is } 1$$

(YES at step S103), thus occurrence of an error is recognized.

The upper stage of FIG. 3A and FIG. 3B, an enlarged view of a part of FIG. 3A, show the relationship. The 31-dot length in 120 dpi is slightly longer than the 23-dot length in 90 dpi. That is, it becomes necessary to extra move the head as much as an error 43 in FIG. 3B. Information to correct the error is sent from the correction data operation section 133 to the bit image data preparation section 14, which then writes an error correction information bit 44 into a lower-dots part on image data 41 expanded in bit image in accordance with the information sent from the correction data operation section 133 at step S104. As previously described, the lower-dots part is an area where normal image data is not expanded.

The one error correction information bit responsive to the remainder 1 corresponds to "$0.25/90$ inches," namely, "$1/360$ inches." If the shift distance shown in FIG. 5 is "ESC¥$31/120$,"

$$(31/120) \times 90 = 24 \text{ with no remainder}$$

(NO at step S103) and an error correction need not be made. Likewise, if the shift distance is "ESC¥$33/120$,"

$$(33/120) \times 90 = 24 \text{ and the remainder is } 3.$$

In this case, three error correction information bits are added. The additional shift distance at this time corresponds to "$1/120$-inches."

Likewise, if the shift distance is "ESC¥$34/120$,"

$$(34/120) \times 90 = 25 \text{ and the remainder is } 2.$$

In this case, two error correction information bits are added. The additional shift distance at this time corresponds to "$1/180$ inches."

Thus, the remainder in the embodiment takes any value of 0 to 3. Whenever the error correction information added in response to the value of the remainder is added one bit, an additional shift distance of "$1/360$ inches" is added according to a procedure described later with reference to FIG. 8.

Next, a 23-dot blank area (23 is the interger value found by the correction data operation section 133) is expanded on the bit image 41 at step S105. In this connection, for "ESC¥$32/120$" or "ESC¥$33/120$," a 24-dot blank area is expanded; for "ESC¥$34/120$," a 25-dot blank area is expanded.

Next, the engine control section 15 causes the print engine to perform actual printing based on the bit image data. The flowchart shown in FIG. 8 shows a control procedure executed at this time. The correction data recognition section 151 reads bit image data from the image buffer at step S201 and determines whether or not error correction information exists, namely, whether or not a remainder mark exists at step S202. The drive control section 152 controls driving the print head based on energization period (Pi) of the head. Then, the energization period (Pi) is found by the sum of Pi0 and f(x) at step S203 where Pi0 denotes the energization period when no remainder exists and f(x) changes in response to the remainder count when a remainder exists. During the normal constant-speed printing, Pi0 is a fixed value and the energization period changes as much as f(x). In contrast, during the acceleration or deceleration printing, the energization period is changed. That is, Pi0 changes and thus the Pi0 change needs to be considered for performing operation to find a correction amount.

If an error correction is not made (in the embodiment, for "ESC¥$32/120$"), the Pi0 value is output intact as the energization period (Pi) at step S204.

The value of the energization period (Pi) found by performing the operation is set in a timer at step S205 and the print head 21 can be driven as long as the setup time.

As seen from the description made so far, in the printer of the invention, if data in a print density different from the print density set in the printer is sent from the host and is data concerning print position setting, printing can be continued at high speed without again executing bit image expansion or setting to high print density of the least common multiple of both densities to match the print densities with each other. Thus, it is made possible to print text data, etc., consisting only of text information and position information at very high speed.

What is claimed is:

1. A printer for enabling one of print densities to be selected for printing, said printer comprising:
    an image buffer for storing unprinted data in a bit image format; and
    a print instruction conversion section for interpreting a received print instruction and executing bit image expansion in said image buffer in a density which is responsive to a print density selected by the printer, characterized in that upon reception of print-position specification information, which represents a shift distance in any density other than the print density selected by the printer, said shift distance measuring a distance to shift a print head, said print instruction conversion section converts the shift distance into that of the print density selected by the printer so as to be expanded in said image buffer.

2. The printer as claimed in claim 1, further including a line buffer for dividing a received print instruction into each piece of information concerning one-line print scanning which is retained thereby, wherein
    if print information with the print density selected by the printer and said print-position specification information, which represents a shift distance in any density other than said print density, are mixed in the information concerning one-line print scanning, said print instruction conversion section converts the shift distance into that of the selected print density.

3. The printer as claimed in claim 1 or 2 wherein said print instruction conversion section includes error correction means for correcting such an error that occurs between the shift distance, being represented by the print-position specification information, and a shift distance, being represented by bit image data expanded in said image buffer.

4. A printer for enabling one of print densities to be selected for printing, said printer comprising:
    an image buffer for storing unprinted data in a bit image format; and
    a print instruction conversion section for interpreting a received print instruction and executing bit image expansion in said image buffer in a density which is responsive to a print density selected by the printer, characterized in that upon reception of print-position specification information, which represents a shift distance in any density other than the print density selected by the printer, said print instruction conversion section converts the shift distance into that of the print density selected by the printer so as to be expanded in said image buffer,
    wherein said print instruction conversion section includes error correction means for correcting such an error that occurs between the shift distance, being represented by the print-position specification information, and a shift distance, being represented by bit image data expanded in said image buffer, and
    wherein said error correction means multiplies a shift distance of a conversion source, which represents with a dot pitch value as a denominator and the number of dots as a numerator, by a dot pitch value of the print density selected in the printer, and if said calculation result is not an integer value such that a fraction of the calculation result comprises an integer value and a remainder found by dividing said numerator by said denominator, said error correction means recognizes that an error occurs and outputs the integer value as the number of dots representing a shift distance as a result of the conversion and the remainder as an error amount.

5. The printer as claimed in claim 4 further including:
    bit image data preparation means, being responsive to output of the number of dots representing the integer value and output of the error amount corresponding to the remainder, for expanding blank bits corresponding to the number of dots of the integer value and error correction information responsive to the error amount in said image buffer; and
    engine control means for reading said error correction information and driving a print engine based on said error correction information.

6. The printer as claimed in claim 5 wherein an area where print information does not exist is provided on the bit image data expanded in said image buffer, and wherein
    said bit image data preparation means stores the error correction information in the area where the print information does not exist.

7. A print density conversion method, comprising:
    receiving print-position specification information representing shift distance in any print density other than a selected print density, said shift distance measuring a distance to shift a print head;
    converting said shift distance into said selected print density; and,
    outputting data in accordance with the conversion.

8. The method according to claim 7, wherein said conversion further comprises correcting an error that occurs due to a mismatch between the received shift distance and a shift distance represented by bit image data expanded in an image buffer.

9. A print density conversion method, comprising:
    receiving print-position specification information representing shift distance in any print density other than a selected print density;
    converting said shift distance into said selected print density; and
    outputting data in accordance with the conversion,
    wherein said conversion further comprises correcting an error that occurs due to a mismatch between the received shift distance and a shift distance represented by bit image data expanded in an image buffer, and
    wherein the error correction comprises multiplying a shift distance of a conversion source, represented by a dot pitch value as a denominator and the number of dots as a numerator, by a dot pitch value of the print density selected in the printer, and if the calculation result comprises an integer value and a remainder found by dividing said numerator by said denominator, an error is recognized and the integer value is outputted as the number of dots representing a shift distance as a result of the conversion and the remainder as the error amount.

10. A print density conversion apparatus, comprising:
    receiving means for receiving print-position specification information representing shift distance in any print density other than a selected print density, said shift distance measuring a distance to shift a print head;
    shift distance conversion means for converting said shift distance into said selected print density; and,
    outputting means for outputting data in accordance with the conversion.

11. The apparatus according to claim 10, wherein said shift distance conversion means further comprises error correction means for correcting an error that occurs due to a mismatch between the received shift distance and a shift distance represented by bit image data expanded in an image buffer.

12. A print density conversion apparatus, comprising:

receiving means for receiving print-position specification information representing shift distance in any print density other than a selected print density;

shift-distance conversion means for converting said shift distance into said selected print density; and, outputting means for outputting data in accordance with the conversion, wherein said shift distance conversion means further comprises error correction means for correcting an error that occurs due to a mismatch between the received shift distance and a shift distance represented by bit image data expanded in an image buffer, and wherein the error correction means further comprises means for multiplying a shift distance of a conversion source, represented by a dot pitch value as a denominator and the number of dots as a numerator, by a dot pitch value of the print density selected in the printer, and if the calculation result comprises an integer value and a remainder found by dividing said numerator by said denominator, said error correction means recognizes an error and outputs the integer value as the number of dots representing a shift distance as a result of the conversion and the remainder as the error amount.

* * * * *